United States Patent
Nishio et al.

[11] Patent Number: 5,973,439
[45] Date of Patent: *Oct. 26, 1999

[54] VIBRATION DRIVEN MOTOR

[75] Inventors: Tetsuya Nishio, Kawasaki; Hajime Kanazawa, Tama, both of Japan

[73] Assignee: Canon Kabushiki Kaisha, Tokyo, Japan

[*] Notice: This patent is subject to a terminal disclaimer.

[21] Appl. No.: 08/340,474

[22] Filed: Nov. 14, 1994

Related U.S. Application Data

[63] Continuation of application No. 07/978,425, Nov. 18, 1992, abandoned.

[30] Foreign Application Priority Data

Nov. 20, 1991 [JP] Japan .................................. 3-304664
Nov. 20, 1991 [JP] Japan .................................. 3-304665

[51] Int. Cl.$^6$ .................................................. H01L 41/08
[52] U.S. Cl. ...................................................... 310/323.12
[58] Field of Search ........................... 310/323, 323.02, 310/323.12, 323.14, 328

[56] References Cited

U.S. PATENT DOCUMENTS

| | | | |
|---|---|---|---|
| 4,663,556 | 5/1987 | Kumada | 310/323 X |
| 4,678,956 | 7/1987 | Izukawa et al. | 310/323 |
| 4,812,697 | 3/1989 | Mishiro | 310/323 |
| 4,933,590 | 6/1990 | Inoue et al. | 310/323 |
| 4,959,579 | 9/1990 | Kuwabara et al. | 310/323 |
| 4,965,482 | 10/1990 | Ohnishi et al. | 310/323 |
| 4,975,614 | 12/1990 | Honda | 310/323 |
| 5,006,746 | 4/1991 | Kasuga et al. | 310/323 |
| 5,049,774 | 9/1991 | Kuwabara et al. | 310/323 |
| 5,051,647 | 9/1991 | Uchikawa et al. | 310/323 |
| 5,053,669 | 10/1991 | Saeki et al. | 310/323 |
| 5,079,470 | 1/1992 | Kasuga et al. | 310/323 |
| 5,091,670 | 2/1992 | Kawata et al. | 310/323 |
| 5,103,128 | 4/1992 | Adachi | 310/323 |
| 5,115,161 | 5/1992 | Myohga et al. | 310/323 |
| 5,210,651 | 5/1993 | Shibuya et al. | 310/323 X |
| 5,231,325 | 7/1993 | Tamai et al. | 310/323 |
| 5,233,257 | 8/1993 | Luthier et al. | 310/323 |
| 5,387,835 | 2/1995 | Tsukimoto et al. | 310/323 |
| 5,428,260 | 6/1995 | Suzuki | 310/323 |
| 5,436,522 | 7/1995 | Tsukimoto et al. | 310/323 |
| 5,506,462 | 4/1996 | Tamai et al. | 310/323 |
| 5,508,580 | 4/1996 | Maeno et al. | 310/323 |

FOREIGN PATENT DOCUMENTS

| | | |
|---|---|---|
| 0450962 | 9/1991 | European Pat. Off. . |
| 0 450 962 | 10/1991 | European Pat. Off. . |
| 0 469 883 | 2/1992 | European Pat. Off. . |
| 0469883 | 8/1992 | European Pat. Off. . |

*Primary Examiner*—Mark O. Budd
*Attorney, Agent, or Firm*—Fitzpatrick, Cella, Harper & Scinto

[57] ABSTRACT

A pencil type vibration wave driven motor includes a vibration member for generating a vibration wave upon energization of a piezo-electric element. The motor further has a compression member for pressing the rotor against the vibration member. The compression member is arranged between the rotor and an output member engaged with the rotor. The output member is supported by a supporting portion provided with the vibration member through a bearing. In this manner, a compression force of the compression member is applied between the rotor and the vibration member without being reduced.

17 Claims, 12 Drawing Sheets

VIBRATION DRIVEN MOTOR

This application is a continuation of application Ser. No. 07/978,425 filed Nov. 18, 1992 now abandoned.

BACKGROUND OF THE INVENTION

1. Field of the Invention

The present invention relates to a vibration driven motor using ultrasonic vibration and, more particularly, to a vibration driven motor used in a camera, OA equipment, and the like.

2. Related Background Art

A conventional pencil-type vibration driven motor is arranged as shown in FIG. 2. More specifically, a vibration member comprising a vibrating body 1, electrode plates 2, piezo-electric elements 3, a pressing body 4, and a bolt 5 is fixed by an adhesive to a fixing member 10 at an anti-rotation portion 5a of the bolt 5.

A spring case 6 is fitted on a shaft portion 10a of the fixing member 10. An output gear 8 is axially supported on the spring case 6 via a bearing 9, and is meshed with a rotor 7.

Since a compression spring 11 is arranged in the spring case 6, as shown in FIG. 2, it urges the rotor 7 against the vibrating body 1 via the spring case 6, the bearing 9, and the gear 8. The rotation of the rotor 7 is frictionally transmitted to the output gear 8.

In order to increase the output of the vibration driven motor, and to drive the motor with high efficiency, it is most important to urge the rotor 7 against the vibrating body 1 in a proper direction at a proper pressure without causing a nonuniformity in the surface pressure.

However, the conventional motor suffers from the following three drawbacks when the arrangement described above is employed.

(1) Adverse influence caused by side pressure of the output gear:

The output gear 8 inevitably receives a radial force (side pressure) when it transmits the output to a transmission gear (not shown). More specifically, in the conventional arrangement, a side pressure is transmitted to the fixing member 10 via the gear 8, the bearing 9, and the spring case 6. At this time, a frictional force between the spring case 6 and the fixing member 10 becomes a force against the biasing force of the compression spring 11, and the biasing force of the compression spring 11 cannot be properly transmitted between the rotor 7 and the vibrating body 1. As a result, the compression force between the rotor 7 and the vibrating body 1 is decreased. When the gear output is large, i.e., the side pressure is large, a frictional force between the spring case 6 and the fixing member 10 becomes too large to ignore, and the output and efficiency of the motor are reduced.

(2) Surface pressure nonuniformity due to bending of the pin 5b:

In the conventional arrangement, the rotor 7 and the output gear 8 are arranged to have the bearing 9 as a fulcrum. Since the bearing 9 as the fulcrum is located at a position separated from a contact portion 7b of the rotor 7 with the vibrating body 1, when the pin 5b is bent, the rotor 7 and the output gear 8 pivot, thus becoming inclined and eccentric with respect to the vibrating body 1. In this case, a surface pressure nonuniformity between the rotor 7 and the vibrating body 1 occurs due to the inclination and eccentricity, resulting in a reduction in the output and efficiency of the motor.

(3) Surface pressure nonuniformity due to a reaction force of a output of gear 8:

FIGS. 3A and 3B are schematic views showing a conventional arrangement.

In FIG. 3A, R indicates the radius of a pitch circle of the gear 8, M indicates the output torque, F indicates the reaction force of the torque, which is given by F=M/R, r indicates the radius of a rotor contact surface, and L indicates the distance between the center of the gear tooth and a rotor contact surface. As shown in FIG. 3B, a surface pressure distribution P due to the reaction force of the gear output is given by:

$$P = F \cdot L \cdot \sin\theta / \pi r^2 \quad (1)$$

$$P_{max} = F \cdot L / \pi r^2 \quad (2)$$

In the conventional arrangement, the gear 8 and the rotor 7 are considered integrated since they are frictionally coupled to each other. In addition, the distance L between the gear and the contact surface is large, and hence, the surface pressure P due to the reaction force of the gear output (from the above equations) is large, resulting in a large surface pressure nonuniformity.

Therefore, the output and efficiency of the motor are reduced.

SUMMARY OF THE INVENTION

It is, therefore, an object of the present invention to provide a vibration driven motor with high efficiency.

It is another object of the present invention to provide a pencil type vibration driven motor with high efficiency.

It is still another object of the present invention to provide a vibration driven motor, which can minimize reduction of efficiency even when a side pressure is applied to an output gear.

One aspect of the present invention is characterized by providing a vibration driven motor comprising a vibration member for forming a circular or elliptical motion of surface portions of a driving surface upon application of an AC field to a clamped driving electro-mechanical energy conversion element, a movable member which is frictionally driven since it is urged against the driving surface of the vibration member via compression means, a rotary output member for extracting an output upon transmission of a rotational force from the movable member, and a fixing member fixed to an end portion of the vibration member on the side of a driving portion, wherein the rotary output member is axially supported by axial support means coaxial with the central axis of the vibration member, and the compression member has a spring member elastically inserted between the rotary output member and the movable member.

Another aspect of the present invention is characterized by providing a vibration driven motor, wherein a rotary output member, e.g., an output gear formed with a gear portion on an outer circumferential surface thereof, is axially supported by a shaft member of a vibration member, so that a side pressure acting on the rotary output member is received by the shaft member, and a compression force of a spring member is applied to a movable member without being influenced by the side pressure acting on the rotary output member.

Other objects of the present invention will be apparent from the following detailed description of the present invention.

DETAILED DESCRIPTION OF THE PREFERRED EMBODIMENTS

Figure 1:
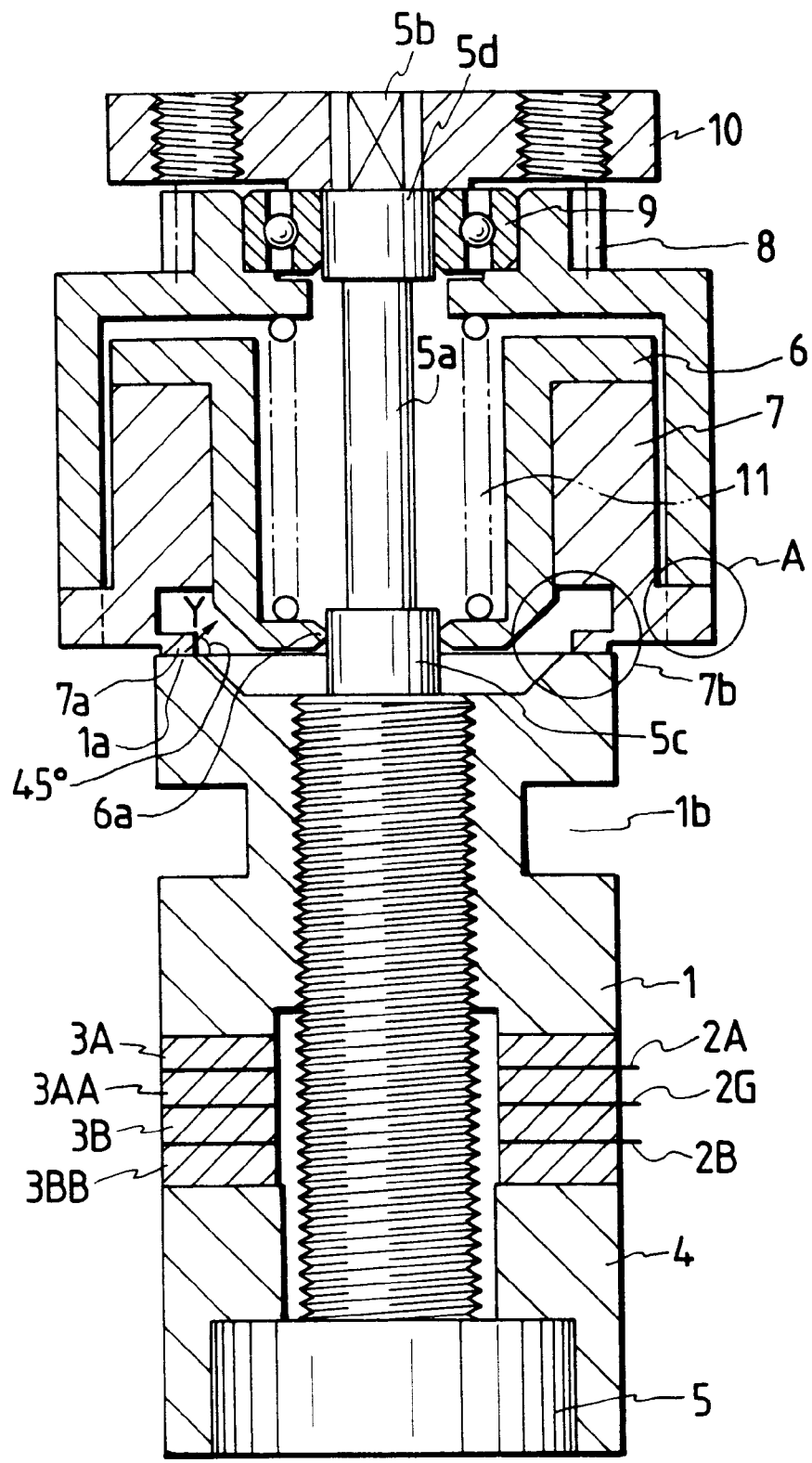
FIG. 1 is a sectional view showing a vibration driven motor according to the first embodiment of the present invention.

FIG. 1 is a longitudinal sectional view showing a vibration driven motor according to a first embodiment of the present invention.

Figure 2:
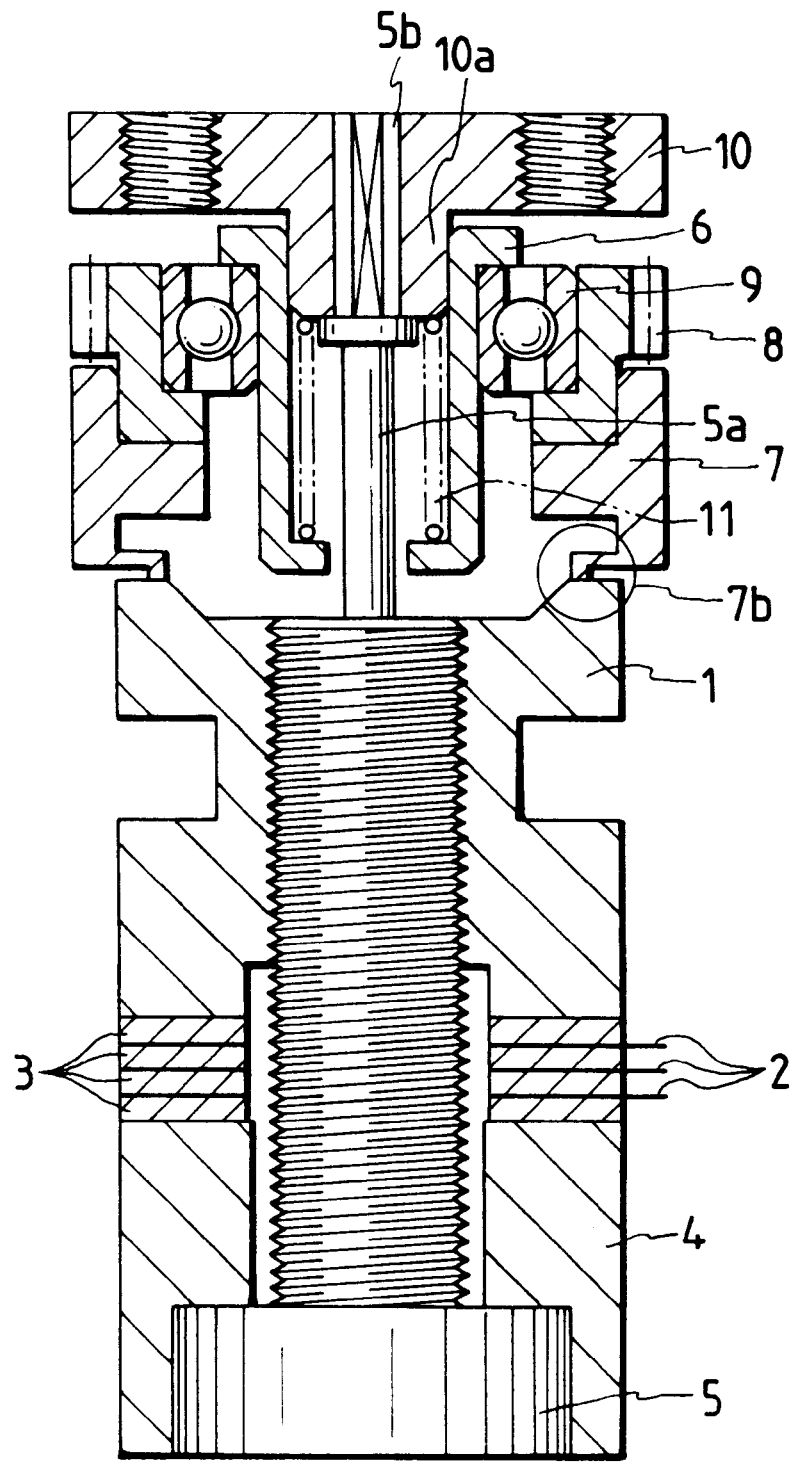
FIG. 2 is a sectional view showing a conventional vibration driven motor.
Figure 3A:
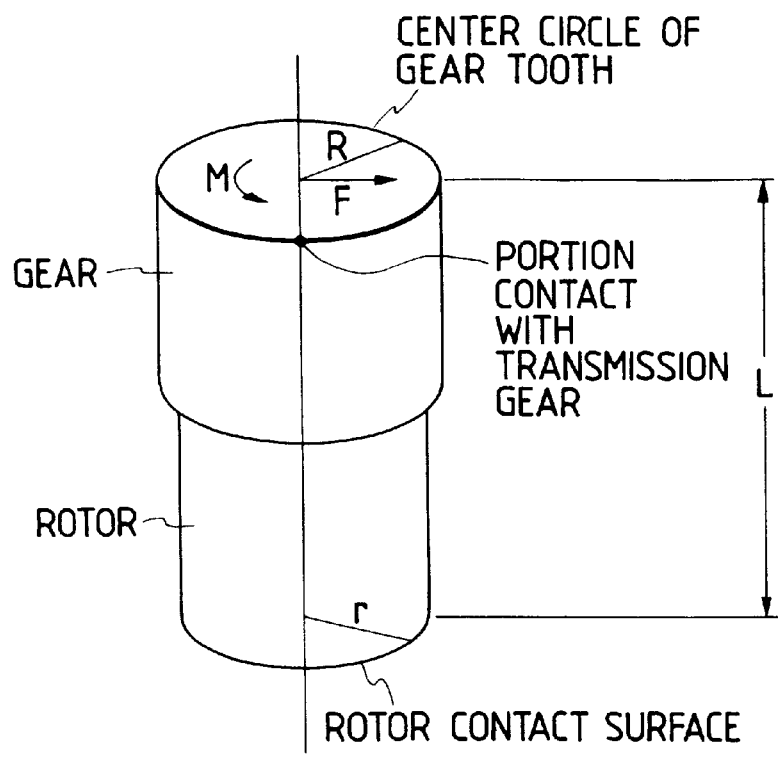
FIGS. 3A and 3B are schematic views for explaining a surface pressure nonuniformity due to a reaction force of a gear output.
Figure 3B:
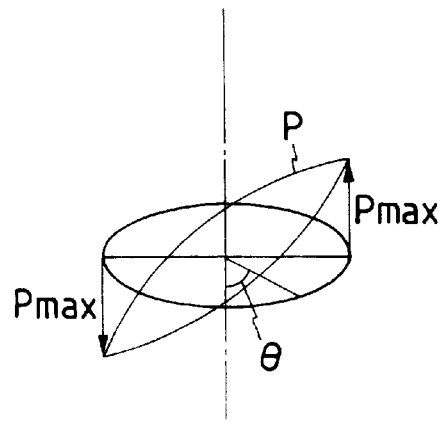

In a vibration member of this embodiment, A phase piezo-electric elements 3A and 3AA, B phase piezo-electric elements 3B and 3BB, and electrode plates 2A, 2G, and 2B are inserted between a vibrating body 1 and a pressing body 4, and are clamped and fixed by a fastening bolt 5 as in the conventional motor shown in FIG. 2. In the bolt 5, a shaft portion is coaxially formed on its effective screw portion. More specifically, a pin portion 5a is formed between first and second shaft portions 5c and 5d, and a distal end fixing shaft portion 5b, which has a that width portion, extends from the second shaft portion 5d.

Figure 4:
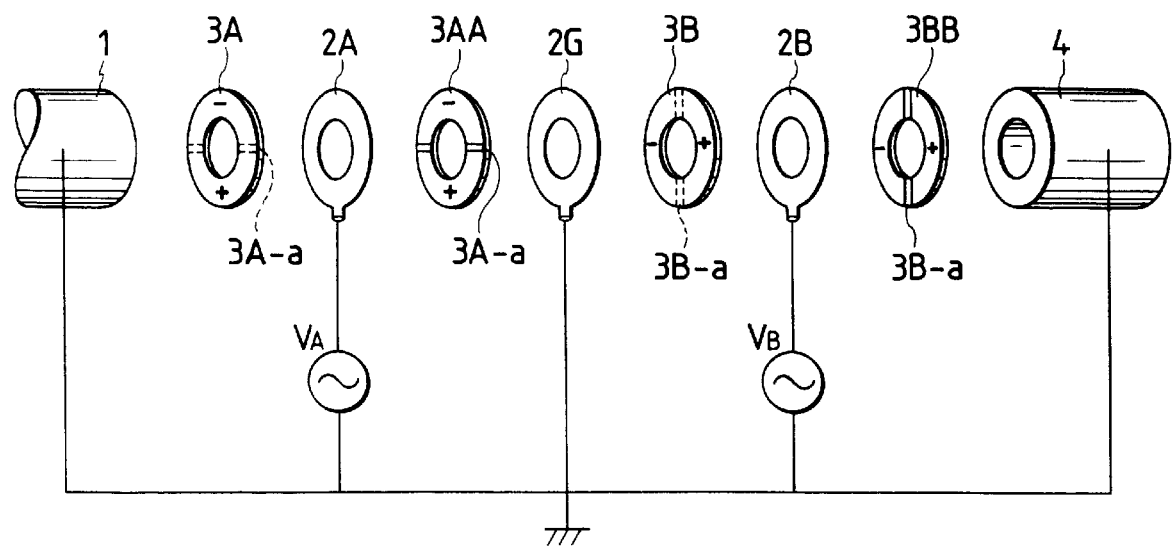
FIG. 4 is an exploded perspective view of a vibration member.

The vibration member is arranged, as shown in FIG. 4. The polarization direction of each of the piezo-electric elements 3A, 3AA, 3B, and 3BB is reversed to have a non-conductive portion 3A-a or 3B-b provided on the axis of diameter as a boundary. The portions having the same polarization directions of the two A phase piezo-electric elements 3A and 3AA are arranged to oppose each other and to sandwich the electrode plate 2A therebetween. Similarly, the portions having the same polarization directions of the two B phase piezo-electric elements 3B and 3BB are arranged to oppose each other and to sandwich the electrode plate 2B therebetween. On the other hand, the two pairs of A and B phase piezo-electric elements are arranged to sandwich the electrode plate 2G therebetween and to have a phase difference of 90°.

Figure 5:
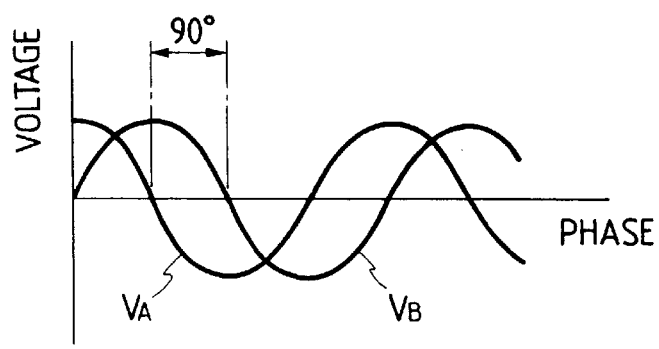
FIG. 5 is a graph showing a driving waveform of the vibration member.

When voltages $V_A$ and $V_B$ having a phase difference of 90° (FIG. 5) are respectively applied to the electrode plates 2A and 2B of the vibration member with the above arrangement, a vibration obtained by synthesizing a flexural vibration generated by the A phase piezo-electric elements, and a flexural vibration generated by the B phase piezo-electric elements is generated in the vibration member (1, 4), and the vibration member makes an oscillating motion.

An end face 1a of the vibrating body 1 serves as a frictional sliding portion contacting a contact portion 7a of a rotor 7 (to be described later), and one point of the frictional sliding portion makes a circular or elliptic motion. The direction in which the circular or elliptic motion vibrates is a direction of an arrow Y in FIG. 1, i.e., in a direction of about 45° with respect to the sliding surface. This vibration defines a circular motion when viewed from a direction of the central axis of the vibration member (1, 4), and gives a rotation to the rotor 7, which contacts the frictional sliding portion 1a at the contact portion 7a.

A constricted portion 1b formed by a circumferential groove portion of the vibrating body 1 has a function of amplifying the displacement of the frictional sliding portion 1a upon driving, and a function of defining the vibration direction of the frictional sliding portion 1a to be 45°.

A lower portion 7b of the rotor 7 is formed to have a shape, so that a deformation direction when the rotor contact portion 7a receives a vibrating force from the vibrating body 1 coincides with the vibration direction of the vibrating body 1 indicated by the arrow Y, and a frictional loss is minimized.

A fixing member 10 is fitted on the distal end fixing portion 5b of the bolt 5, and is fixed thereto by, e.g., an adhesive. Therefore, when the fixing member 10 is mounted on a fixed member (not shown) by, e.g., a screw, the vibration member can be supported.

A resin spring case 6 incorporates a compression spring 11, and is integrated with the rotor 7, which is fitted on the spring case 6, and is fixed thereto by an adhesive. A lower end portion 6a of the spring case 6 has a small-diameter hole, as shown in FIG. 1, and an edge portion formed on the inner edge portion of the small-diameter hole forms a contact line with the first shaft portion 5c. Therefore, the rotor 7 can be desirably inclined with respect to the first shaft portion 5c to have the lower end portion 6a of the spring case 6 as a fulcrum, which portion is in line contact with the first shaft portion 5c.

An output gear 8 serves as a rotary output member formed with a gear portion on an upper portion of its outer circumferential surface. A portion, corresponding to the gear portion, of the output gear 8 is fitted on and axially supported by a bearing 9 attached to the second shaft portion 5d. The lower end portion of the output gear 8 extends to the lower end portion of the rotor 7, and is engaged with the rotor 7 at a portion indicated by A in FIG. 1 by a coupling method, which allows a backlash in the radial direction, but does not allow rotation in the circumferential direction. Thus, the rotational force of the rotor 7 is directly transmitted to the output gear 8. Therefore, even when the rotor 7 is inclined, the output gear 8 can be held in the illustrated position. In a state wherein the output gear 8 is mounted at a predetermined position, the output gear 8 compresses the compression spring 11 in the spring case 6, and applies a biasing force for urging the rotor 7 against the vibrating body 1.

In the vibration driven motor of this embodiment with the above arrangement, since the output gear 8 is axially supported on the second shaft portion 5d of the bolt 5 via the bearing 9, the radial force (side pressure) acting on the output gear 8 when the output gear 8 transmits its output to a transmission gear (not shown) is transmitted to the second shaft portion 5d via the bearing 9, and does not influence the biasing force of the compression spring 11.

Therefore, the rotor 7 is properly urged against the vibrating body 1 without being influenced by the side pressure on the output gear 8.

The rotor 7 is axially supported on the second shaft portion 5c at the lower end portion 6a of the spring case 6. The axially supported portion is located at the base of the pin portion 5a of the bolt 5, and substantially flush with the contact surface between the rotor 7 and the vibrating body 1. Since the lower end portion 6a of the spring case 6 can be desirably inclined with respect to the shaft portion of the bolt, even when the pin portion 5a is bent, the rotor 7 is inclined with respect to the vibrating body 1, and can properly contact the vibrating body without causing eccentricity.

Therefore, surface pressure nonuniformity will not be caused by the inclination and eccentricity of the rotor.

The rotational force of the rotor 7 is transmitted to the output gear 8 via the portion A. The portion A is substantially flush with the contact surface between the rotor 7 and the vibrating body 1, as shown in FIG. 1.

The surface pressure distribution due to the reaction force of the gear output is given by the above-mentioned equations (1) and (2). In this embodiment, since the portion A is substantially flush with the contact surface between the rotor 7 and the vibrating body 1, L in equations (1) and (2) has a vary small value, and the surface pressure nonuniformity due to the reaction force of the gear output becomes very small.

As described above, according to the arrangement of this embodiment, the rotor can be urged against the vibrating body 1 in a proper direction at a proper pressure without causing the surface pressure nonuniformity, and a vibration driven motor with a large output and high efficiency can be realized.

In this embodiment, the gear is used as the rotary output member. However, the same effect as above can be expected even when a pulley, or the like is used.

Figure 6:
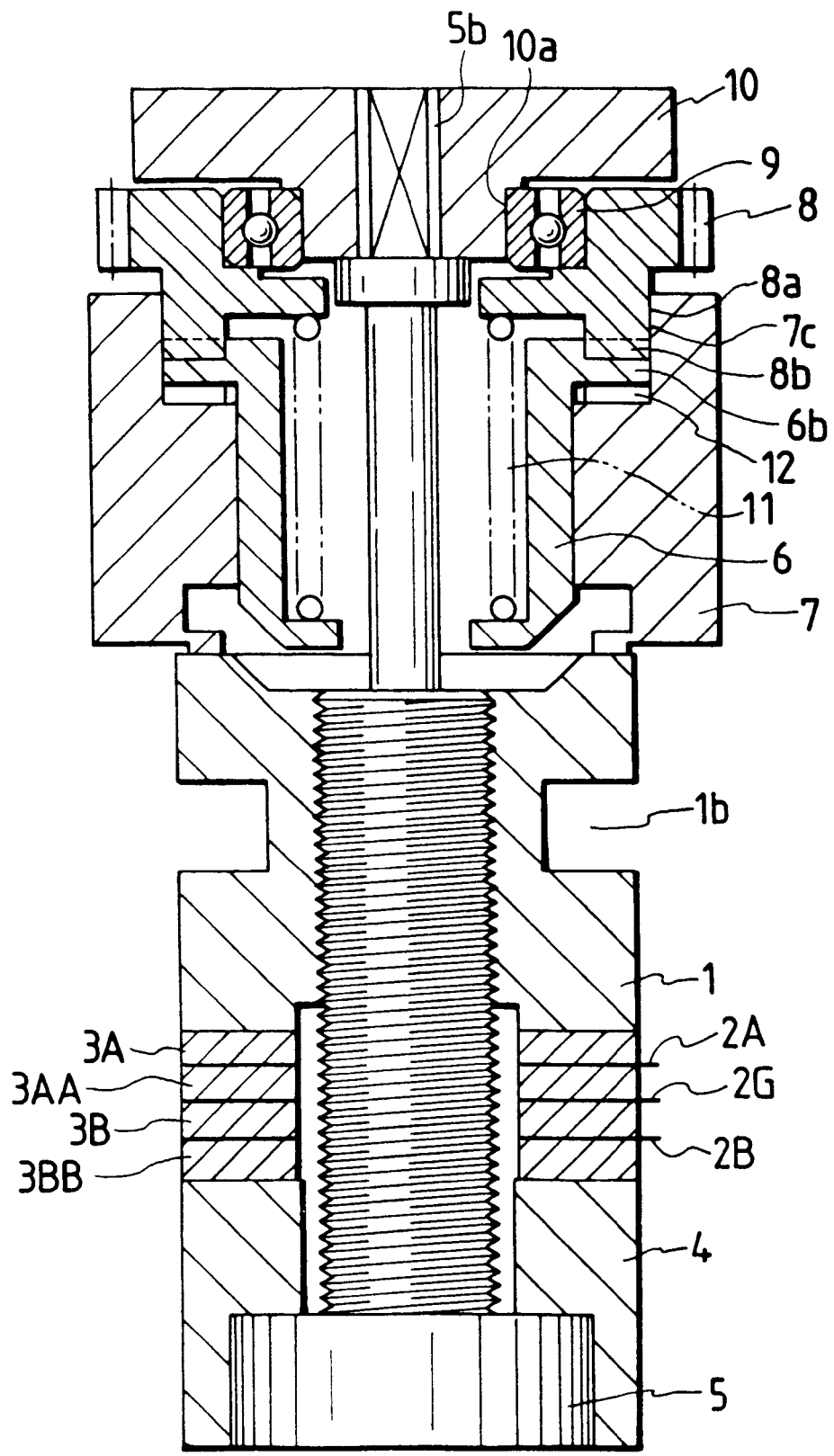
FIG. 6 is a sectional view of a vibration driven motor according to a second embodiment of the present invention.

FIG. 6 shows a vibration driven motor according to a second embodiment of the present invention.

In this embodiment, the arrangement of a vibration member is substantially the same as that of the first embodiment shown in FIG. 1, except that a fixing member 10 fixed by an adhesive to a distal end fixing shaft portion 5b of a bolt 5 is formed with a shaft portion 10a adjacent the distal end fixing shaft portion 5b, and a bearing 9 is attached to the shaft portion 10a.

A spring case 6, which incorporates a compression spring 11, is fixed to a rotor 7 by an adhesive in the first embodiment. However, in this embodiment, the spring case 6 and the rotor 7 are integrally rotatable by the biasing force of the compression spring 11 via a rubber spacer 12.

An inner cylinder portion 7c of the rotor 7 is fitted on a shaft portion 8a of an output gear 8. An engaging portion 8b of the output gear 8 and an engaging portion 6b of the spring case 6 are engaged with each other to prevent rotation about the axis, and to transmit the rotation of the rotor 7, which rotates integrally with the spring case 6, to the output gear 8. Note that this anti-rotation portion is movable in the thrust direction. The compression spring 11 is elastically inserted between the output gear 8 and the spring case 6, and biases the rotor 7 against the vibrating body 1. This biasing force is also applied to the rubber spacer 12 located between the spring case 6 and the rotor 7, so that the spring case 6 and the rotor 7 are rotated together by frictional forces between the spring case 6 and the rubber spacer 12 and between the rubber spacer 12 and the rotor 7. When a force larger than these frictional forces is applied to the output gear 8, the rubber spacer slides to prevent the rotor 7 from being overloaded. The output gear 8 is axially supported on the shaft portion 10a of the fixing member 10 via the bearing 9. Therefore, a radial force (side pressure) acting on the output gear 8 when the output gear 8 transmits its output to a transmission gear (not shown) is transmitted to the shaft portion 10a of the fixing member 10 via the bearing 9, and does not influence the biasing force of the compression spring 11.

Figure 7:
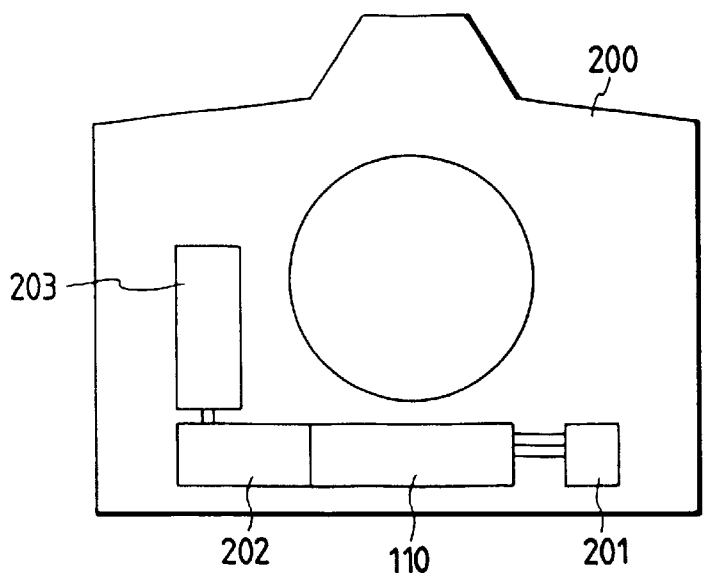
FIG. 7 is a schematic view of a film feed mechanism for a camera using a vibration driven motor.

FIG. 7 shows a case wherein the vibration driven motor of the present invention is applied to a drive source of a film wind-up mechanism for a camera.

In FIG. 7, a camera 200 comprises a vibration driven motor controller 201, a transmission device 202, a film wind-up spool 203, and a vibration driven motor 110. The vibration driven motor is controlled by the controller 201 by a known method, and its output is transmitted to the film wind-up spool 203 via the transmission device 202. Upon rotation of the spool 203, a film (not shown) is wound up.

In this case, since the vibration driven motor of the present invention has a large output and high efficiency, a high-performance film wind-up operation can be realized. By utilizing the low rotational speed, large torque, and low noise features of the vibration driven motor, quiet characteristics remarkably superior to a conventional camera using an electromagnetic motor can be realized.

Figure 8:
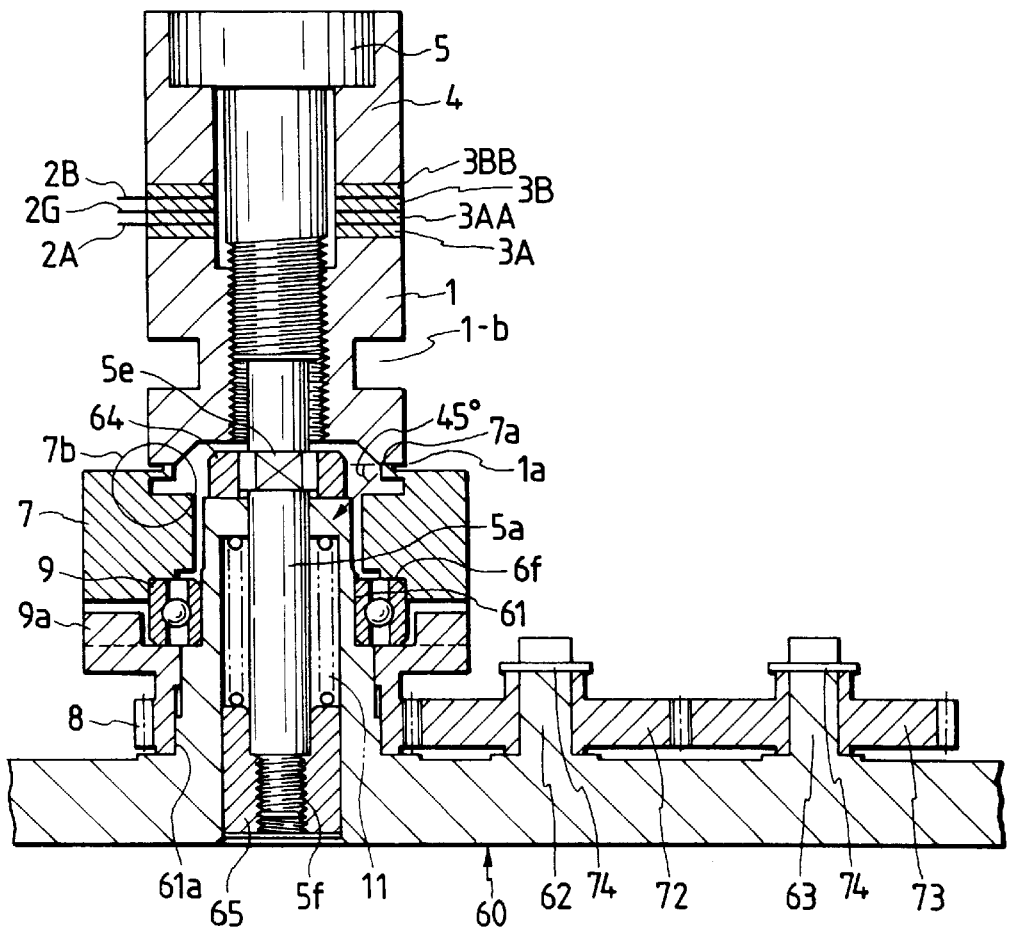
FIG. 8 is a sectional view showing a vibration driven motor according to a third embodiment of the present invention.

FIG. 8 shows a vibration driven motor according to a third embodiment of the present invention.

In a vibration driven motor of this embodiment, a fixing member 60 for supporting and fixing a vibration member is formed integrally with a spring case (sleeve) 61, and support shafts 62 and 63 of transmission gears 72 and 73 to be meshed with an output gear 8 are also formed integrally with the fixing member 60.

The output gear 8 is rotatably and axially supported on the outer circumferential surface of the spring case 61 formed integrally with the fixing member 60, and a bearing 9 is coaxially attached thereto. A rotor 7 is fitted on the bearing 9, and contacts a vibrating body 1 of the vibration member with the same arrangement as that of each of the above embodiments.

The rotor 7 and the output gear 8 are coupled to each other by the same method as in the embodiment shown in FIG. 1, and the output gear 8 is rotated integrally with the rotor 7.

An intermediate fixing shaft portion 5e having a double flat portion is formed at the base portion of a pin portion 5a of the bolt 5, and a stopper 64 formed at the end portion of the sleeve 61 is non-rotatably fitted on the intermediate fixing shaft portion 5e. Therefore, the vibration member is supported on the fixing member 60, so that the rotational direction of the vibration member is regulated by engagement between the intermediate fixing shaft portion 5e of the bolt 5 and the stopper 64. A distal end screw portion 5f is formed at the distal end portion of the bolt 5, and is threadably engaged with a spring pressing member 65 to bias a compression spring 11. Note that the spring pressing member 65 is attached to the sleeve 61 without a backlash, so that the biasing force of the compression spring 11 is applied to the rotor 7 via the bearing 9.

The gears 72 and 73 axially supported on the support shafts 62 and 63 formed integrally with the fixing member 60 can be prevented from being disengaged by anti-disengagement members 74. In this manner, since the support shafts of the transmission gears 72 and 73 and the sleeve 61 serving as the support shaft of the output gear 8 are formed integrally with the fixing member, the interval between adjacent shafts can be normally maintained, and the rotation of the output gear 8 can be efficiently transmitted to the transmission gear 72.

Since the sleeve 61, which axially supports the output gear 8 and the bearing 9, and receives the pin portion 5a of the bolt 5, is formed integrally with the fixing member 60, the output gear 8 and the rotor 7 can be coaxially supported with respect to the central axis of the vibration member.

Therefore, a contact state between the contact portion of the rotor 7 and a sliding portion 1a of the vibration member can be normally maintained, and a vibrating force of the vibration member can be efficiently converted into rotation of the rotor.

Note that the same effect as in the above embodiment can be obtained with respect to the side pressure acting on the output gear 8.

In this embodiment, the rotor and the output gear are independently arranged, but may be integrated.

Figure 9:
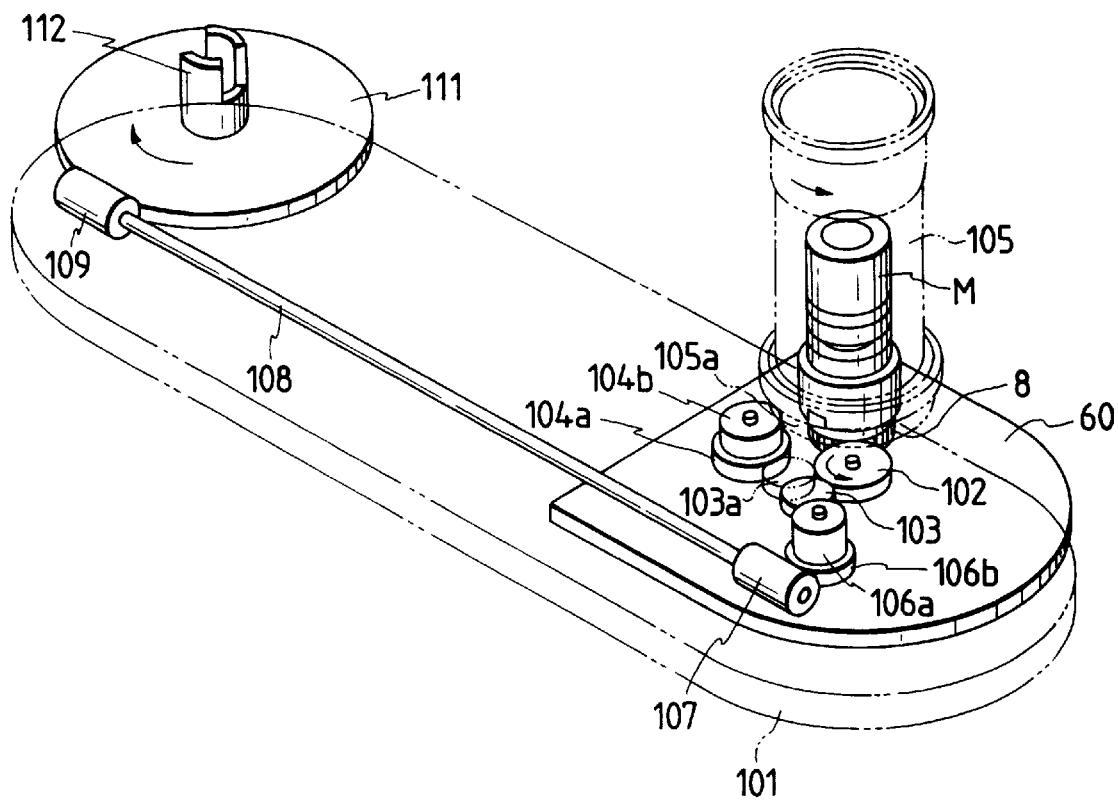
FIG. 9 is a schematic perspective view of a film feed mechanism for a camera using the vibration driven motor shown in FIG. 8.

FIG. 9 shows a case wherein the vibration driven motor shown in FIG. 8 is applied to a film wind-up/rewind mechanism for a camera.

The mechanism shown in FIG. 9 includes a vibration driven motor M, a bottom plate 101 attached to a camera main body (not shown), a sun gear 102, and a planetary gear 103. These gears 102 and 103 form a planetary clutch, and switch an output between film wind-up and rewind directions according to the rotational direction of the vibration driven motor M. The mechanism also includes spool driving gears 104 (104a and 104b), a spool 105, transmission gears 106 (106a and 106b), worm gears 107 and 109, a transmission shaft 108, a fork gear 111, and a rewind fork 112.

The spool 105 is rotatably held by the fixing member 60. The vibration driven motor M is arranged in the spool 105.

The fixing member 60 supports the vibration driven motor M, and the gears 102, 106, and 104, and is fixed to the bottom plate 101. The output gear 8 of the vibration driven motor M is meshed with the sun gear 102, and the sun gear 102 is rotated in the direction of the arrow (FIG. 9). The planetary gear 103 is located at the position shown in FIG. 9, and is meshed with the transmission gear 106a. The rotation of the sun gear 102 is transmitted via the helical gear 106b, the worm gear 107, the transmission shaft 108, the worm gear 109, and the fork gear 111, and the rewind fork 112 is rotated in the direction of the arrow (FIG. 9). As a result, a film is rewound into a film patrone (not shown). The transmission shaft 108 and the fork gear 111 are rotatably held by the bottom plate 101, and the fork gear 111 and the rewind fork 112, and the transmission shaft 108 and the worm gears 107 and 109 are rotated together.

When the vibration driven motor M is rotated in the opposite direction, the sun gear 102 is rotated in a direction opposite to the direction of the arrow. The planetary gear 103 is located at a position indicated by an alternate long and short dashed line, and is meshed with the spool driving gear 104a. The spool driving gear 104a is meshed with a gear portion 105a of the spool 105 to rotate the spool 105 in the direction of the arrow (FIG. 9), thereby winding up the film.

As described above, according to the embodiment of the present invention, the following effects can be expected.

(1) A rotary output member, e.g., an output gear formed with a gear portion on its outer circumferential surface, is axially supported by a shaft portion of a vibration member or a fixing member. A compression means comprising a spring member elastically inserted between the rotary output member and a movable member also is provided. Therefore, the movable member can be properly urged against the driving surface of the vibration member without being influenced by a side pressure acting on the output gear.

(2) Since the fixing member and the axial support portions of the movable member and the rotary output member are integrally formed, the central axes can coincide with each other, and the efficiency of the motor can be improved. When the support shaft of a transmission gear is formed integrally with the fixing member, a predetermined spacing between the axes of the rotary output member and the transmission gear can be precisely maintained. As a result, the vibration driven motor with a large output and high transmission efficiency can be realized, and a low-cost, compact structure can also be realized by integral molding.

Figure 10:
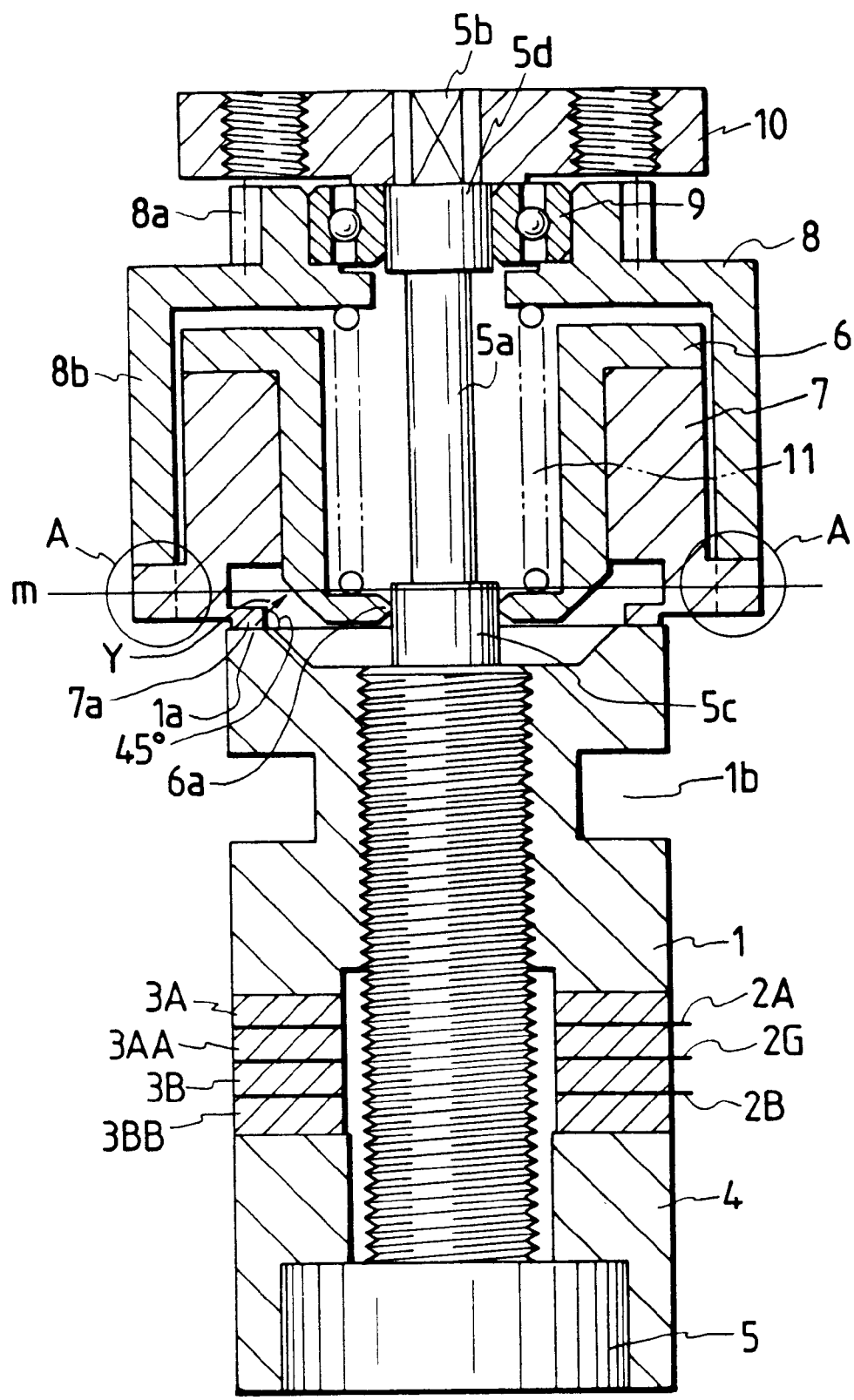
FIG. 10 is a sectional view of a vibration driven motor according to a fourth embodiment of the present invention.

FIG. 10 is a sectional view of a vibration driven motor according to a fourth embodiment of the present invention.

Since this embodiment is similar to the embodiment shown in FIG. 1, components different from those in the embodiment shown in FIG. 1 will be described below. The same reference numerals in FIG. 10 denote the same parts as in FIG. 1, and a detailed description thereof will be omitted.

In FIG. 10, an output gear 8 is formed integrally with a gear portion 8a on an upper portion of a cylindrical cylinder portion 8b, and an inner cylinder portion corresponding to the gear portion 8a is fitted on a bearing 9 and is axially supported by a second shaft portion 5d. A compression spring 11 is pressed by the output gear 8 to apply a biasing force to a rotor 7, so that a sliding portion 7a of the rotor 7 is urged against a driving surface 1a of a vibrating body 1.

Since the lower end of the cylinder portion 8b of the output gear 8 is non-rotatably engaged with the lower end of the rotor 7 at anti-rotation engaging portions A, the rotational force of the rotor 7 can be directly transmitted to the output gear 8. The pair of anti-rotation engaging portions A are formed to be symmetrical about the rotating shaft of the motor, and FIG. 11 illustrates the details of the anti-rotation engaging portions A.

Figure 11:
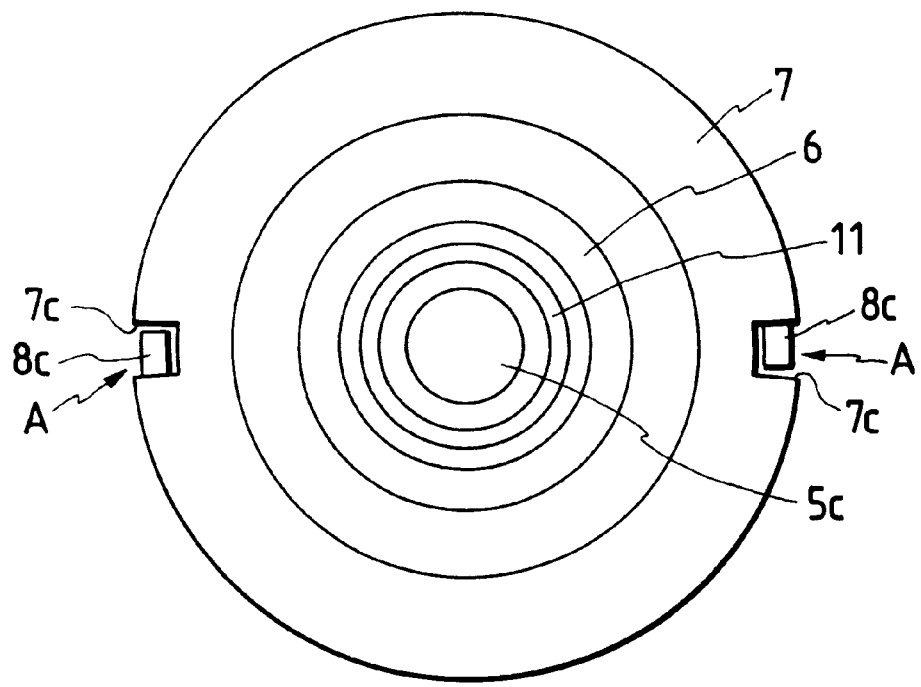
FIG. 11 is a sectional view showing an anti-rotation engaging portion of the fourth embodiment.

FIG. 11 is a sectional view taken along a plane m in FIG. 10. Engaging projections 8c are formed on the lower end of the cylinder portion 8b. The engaging projections 8c are engaged with recess portions 7c formed in the circumferential surface of the rotor 7 without a backlash in the rotational direction, and with a backlash in the radial and thrust directions, so that the rotor 7 and the output gear 8 are movable in the radial direction.

Since the anti-rotation engaging portions A for transmitting the rotational force of the rotor to the output gear 8 are formed at positions symmetrical about the rotating shaft, the reaction force of the output from the output gear 8 equally acts on the pair of anti-rotation engaging portions A, and becomes side pressures to the rotor 7. However, since the magnitudes of these pressures are equal to each other, and have opposite directions, the pressures cancel each other.

Therefore, since the side pressures to the rotor 7 caused by the reaction force of the output from the output gear 8 can be removed, a stable rotation free from a surface pressure nonuniformity can be obtained, and the energy conversion efficiency of the motor can be improved.

Since the center of gravity of a rotating member coincides with the rotating axis, eccentricity of the center of gravity will not occur upon rotation, and no unnecessary vibration will be generated.

Meanwhile, the reaction force of the gear output from the output gear 8 acts on the anti-rotation engaging portions A, and this force is equivalent to a side pressure in a plane including the anti-rotation engaging portion A, and perpendicular to the pin portion 5a. Although this force acts on a bearing portion 6a of the spring case 6, and a first shaft portion 5c, since the bearing portion 6a of the spring case 6 and the first shaft portion 5c are present in a plane including the anti-rotation engaging portions A and perpendicular to the central axis, no force for inclining the rotor 7 will be generated by the reaction force of the gear output.

Also, in this respect, a stable rotation free from a surface pressure nonuniformity due to the reaction force of the gear output can be obtained, and the energy conversion efficiency of the motor can be improved.

Even when the contact surface between the rotor and the vibration member cannot be perpendicular to the rotating shaft of the rotor due to poor machining precision, since the rotor can be inclined, it is difficult for a surface pressure nonuniformity to occur.

Figure 12:
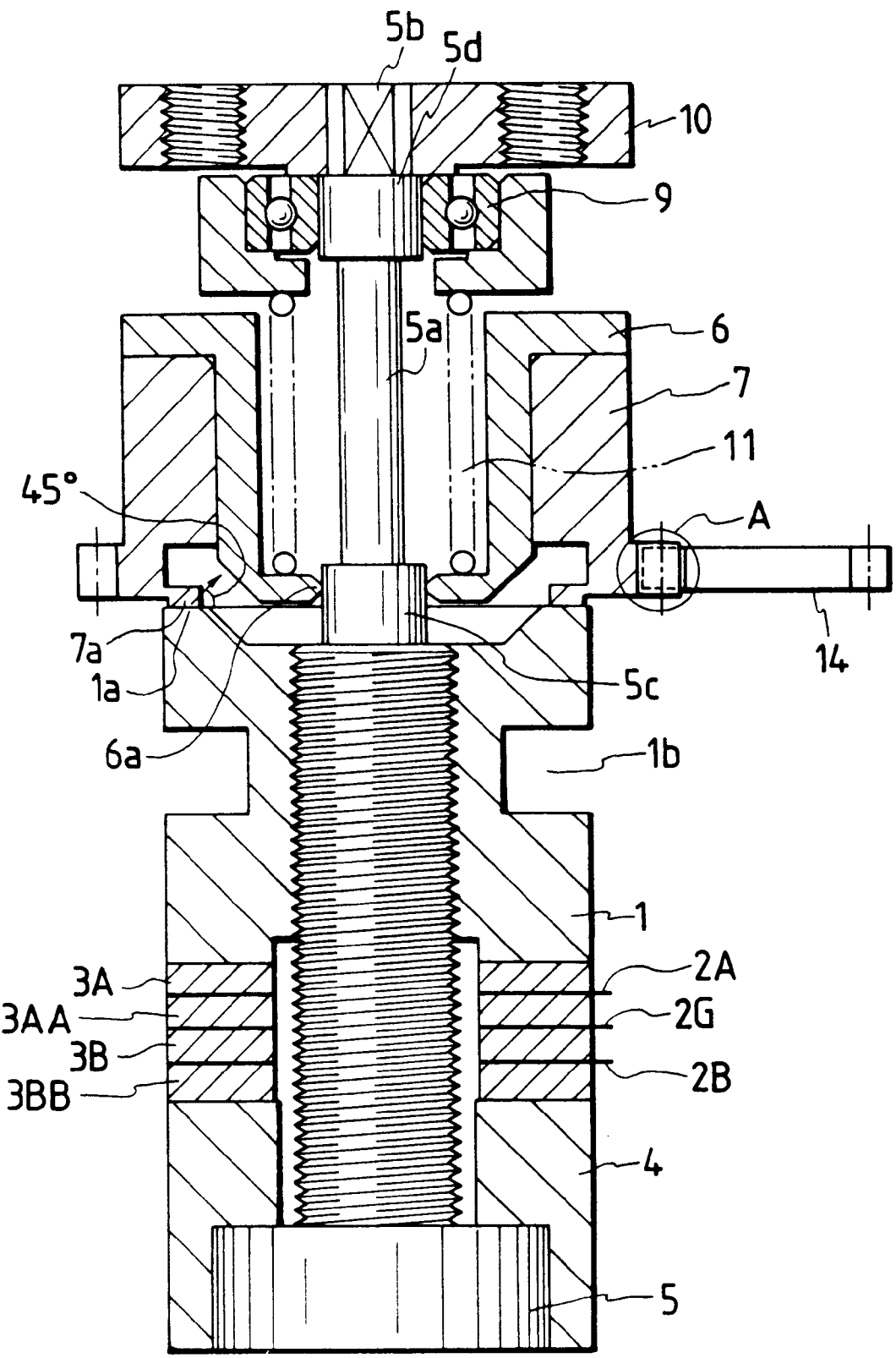
FIG. 12 is a sectional view of a vibration driven motor according to a fifth embodiment of the present invention.

FIG. 12 shows a modification of the embodiment shown in FIG. 10. In this modification, the output gear 8 is omitted, and a gear portion is formed on a portion, corresponding to anti-rotation engaging portions, of the rotor 7, so that the rotor 7 also serves as a rotary output member. Thus, the rotational force of the rotor 7 is directly transmitted to a transmission gear 14 meshed with the gear portion, thus obtaining the same effect as described above.

Figure 13:
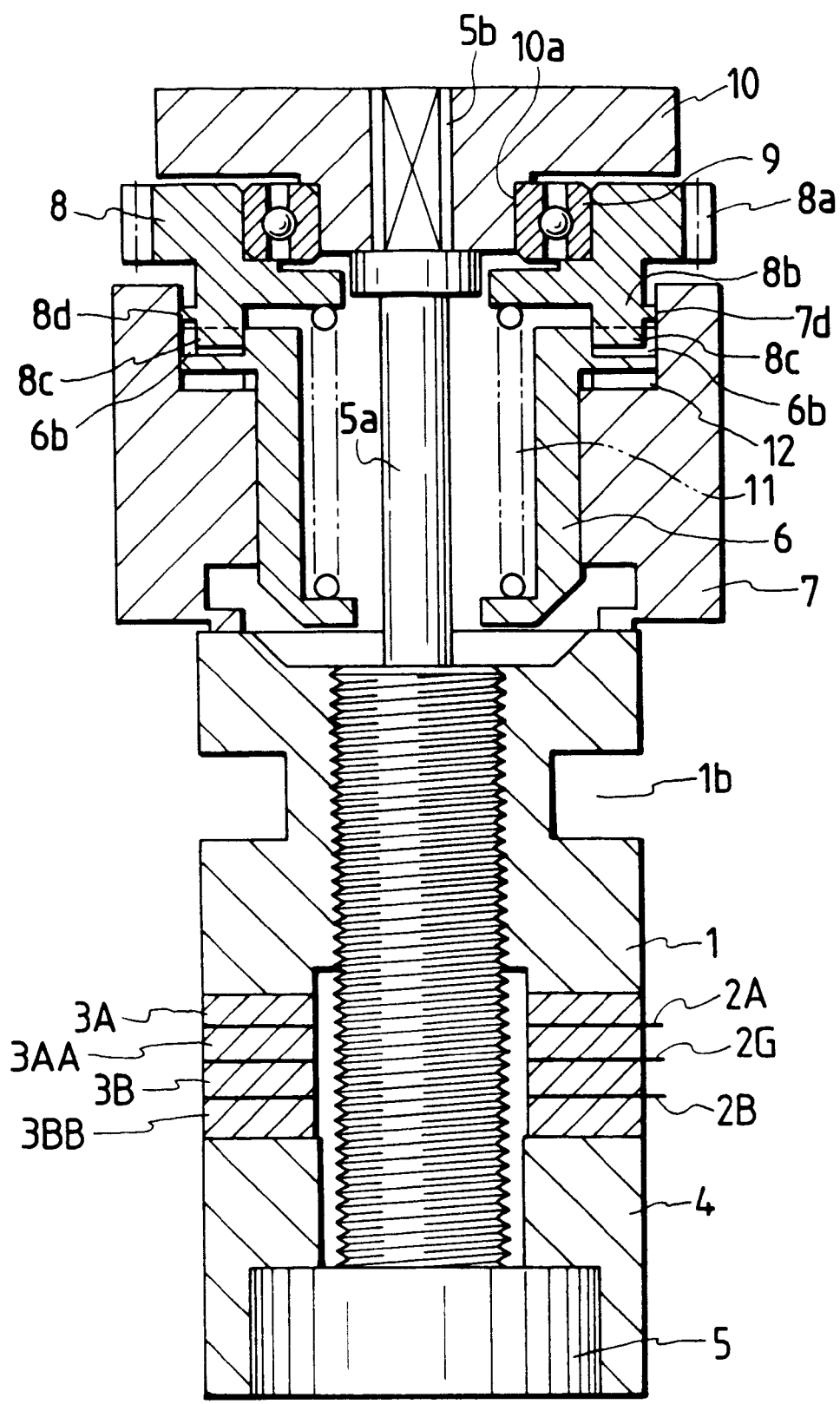
FIG. 13 is a sectional view of a vibration driven motor according to a sixth embodiment of the present invention.

FIG. 13 is a sectional view showing a vibration driven motor according to a fifth embodiment of the present invention.

In this embodiment, the structure of a vibration member (1, 2A, 2B, 2G, 3A, 3B, 3AA, 3BB, 4, 5) is substantially the same as that in the embodiment shown in FIG. 10. More specifically, a bearing 9 is attached to a shaft portion 10a of a fixing member 10 fixed to a distal end anti-rotation portion 5b of the bolt 5, and an output gear 8 is attached to the bearing 9. The output gear 8 of this embodiment has a short cylinder portion 8b, and a flange portion 8d formed on the outer circumferential surface of the cylinder portion 8b contacts an inner cylinder portion 7d of a rotor 7 but is fitted therein to be movable in the thrust direction (axial direction).

A spring case 6 is fitted in the rotor 7 via a rubber spacer 12, and applies the biasing force of an internal compression spring 11 to the rotor 7 via the rubber spacer 12, thereby biasing the rotor 7 against a vibrating body 1. The spring case 6 rotates integrally with the rotor 7. Note that the compression spring 11 receives a reaction force from the output gear 8 as in the above embodiment.

A pair of anti-rotation engaging projections 8c symmetrically formed on the cylinder portion 8b of the output gear 8 are respectively engaged with engaging recess portions 6b with bottoms formed symmetrically in the spring case 6 so as to transmit the rotation of the rotor 7, which rotates together with the spring case 6, to the output gear 8. The anti-rotation engagement allows movement in the thrust direction. The rotor 7 can be inclined to have a contact between the flange portion 8d of the output gear 8 and the inner cylinder portion 7d of the rotor 7 as a fulcrum.

The spring case 6 and the rotor 7 are rotated together by frictional forces between the spring case 6 and the rubber spacer 12 and between the rubber spacer 12 and the rotor 7. When a force larger than these frictional forces is applied to the output gear 8, the rubber spacer 12 slides to prevent the rotor 7 from being overloaded.

In the vibration driven motor of this embodiment, since the spring case 6 and the output gear 8 integrally rotate upon engagement between the pair of anti-rotation engaging projections 8c and the engaging recess portions 6b, which are formed at symmetrical positions, the rotational force of the rotor 7 is equally applied to the pair of anti-rotation engaging portions. However, side pressures caused by these portions cancel each other to become zero. Therefore, no surface pressure nonuniformity is caused by the reaction force of the gear output from the output gear 8, thus obtaining a stable rotation and improving the energy conversion efficiency of the motor.

Since the center of gravity of a rotating member coincides with the rotating axis, eccentricity of the center of gravity will not occur upon rotation, and no unnecessary vibration will be generated.

Meanwhile, the reaction force of the gear output from the output gear acts on the engaging recess portions 6b of the spring case 6, and side pressures generated by these portions act on a contact portion between the flange portion 8d of the output gear 8 for axially supporting the rotor 7, and the inner cylinder portion 7d of the rotor 7. In this case, since the flange portion 8d of the output gear 8 contacts the inner cylinder portion 7d of the rotor 7 near a plane including the anti-rotation recess portions 6b as portions for transmitting the rotational force of the rotor 7, and perpendicular to the central axis, a force which intends to incline the rotor 7 is very small. Therefore, in this respect, a surface pressure nonuniformity caused by the reaction force of the gear output is very small, a stable rotation can be obtained, and the conversion efficiency of the motor can be improved.

In the fourth embodiment shown in FIG. 10, the rotor 7 and the output gear 8 are non-rotatably engaged with each other by a pair of anti-rotation engaging means arranged at symmetrical positions, while in the fifth embodiment shown in FIG. 13, the output gear 8 and the spring case 6 are non-rotatably engaged with each other by the same method as in the fourth embodiment. However, the present invention is not limited to these methods. For example, a method shown in FIG. 14 may be employed.

Figure 14:
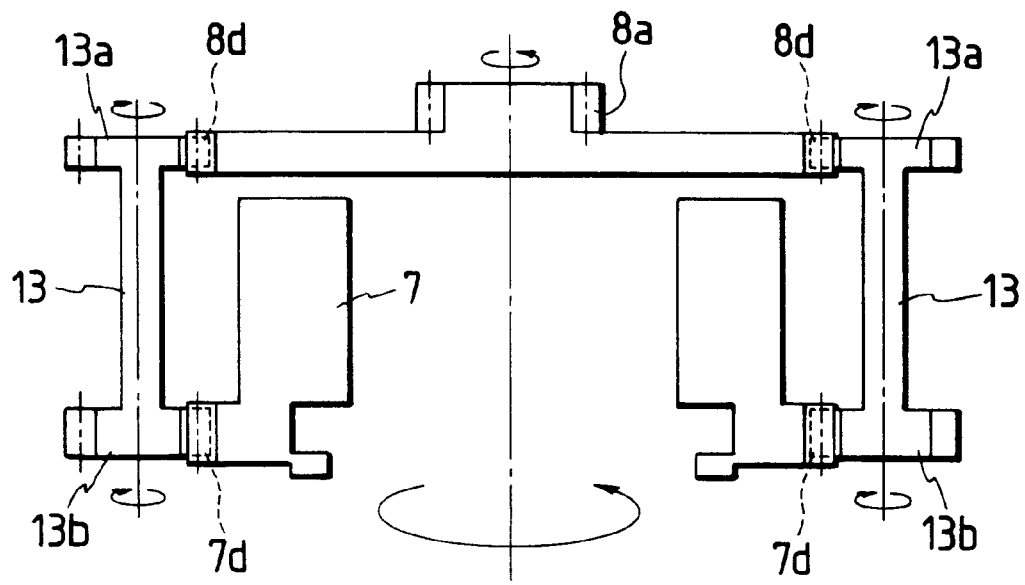
FIG. 14 is a sectional view of a vibration driven motor according to a modification of the fourth embodiment of the present invention.

FIG. 14 shows a case wherein the rotor 7 and the output gear 8 are directly coupled to each other. Upper and lower gears 13a and 13b of a pair of coupling gears 13 arranged at symmetrical positions are respectively meshed with a coupling gear 8d of the output gear 8, and a coupling gear 7d of the rotor 7, so that the rotation of the rotor 7 can be transmitted through the pair of coupling gears 13.

In this case, the reaction force of the gear output from the output gear 8 is canceled in the same manner as in the embodiments shown in FIGS. 10 and 13.

Figure 15:
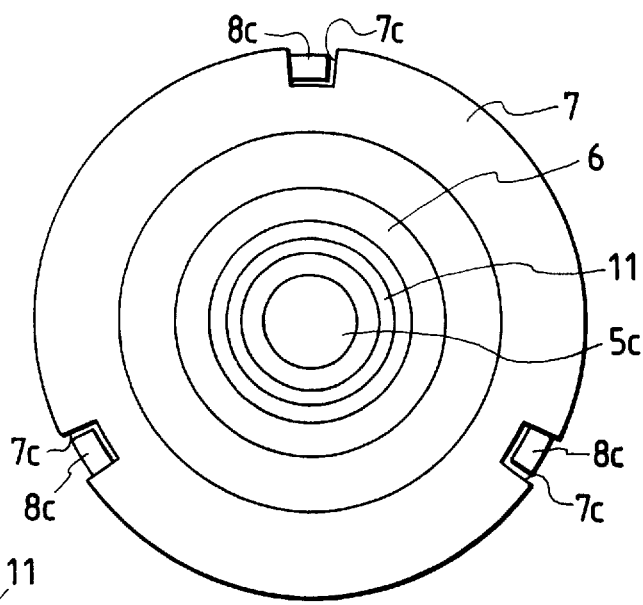
FIG. 15 is a sectional view showing another embodiment of the anti-rotation engaging portion.

In the embodiments described above, the rotor as a movable member or portions for transmitting the rotational force of the rotor of members integrated with the rotor have an anti-rotation configuration. However, the present invention is not limited to this. For example, in the embodiment shown in FIG. 10, the pair of portions (7c, 8c) for transmitting the rotational force of the rotor are symmetrically provided to the rotor 7 and the output gear 8. However, the number of such portions is not limited to two. Two or more portions may be provided as long as they have rotational symmetry so that the reaction force of the output is uniformly applied. For example, as shown in FIG. 15, three portions for transmitting the rotational force of the rotor may be arranged at angular intervals of 120° when viewed from the thrust direction. Similarly, when the number of anti-rotation engaging portions is represented by n, n portions may be arranged at angular intervals of 360°/n as long as they have rotational symmetry.

Figure 16:
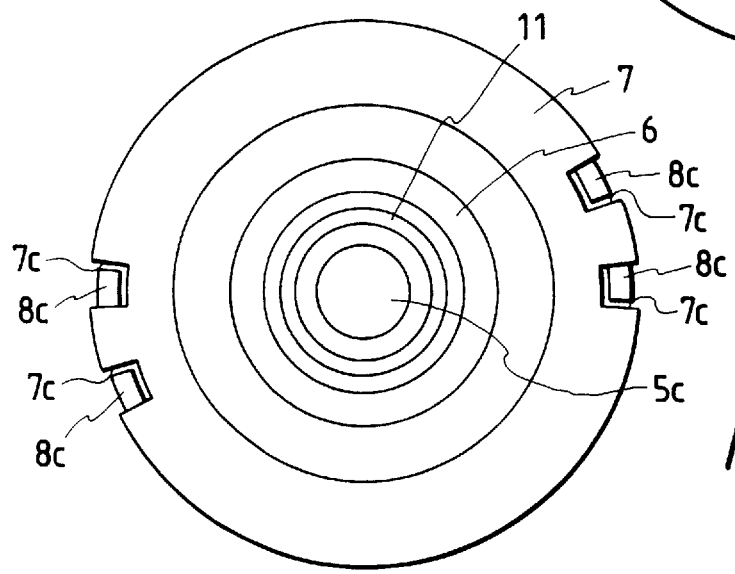
FIG. 16 is a sectional view showing still another embodiment of the anti-rotation engaging portion.

For example, in FIG. 16, although anti-rotation engaging portions (7c, 8c) are arranged at four positions not at angular intervals of 90°, they have 2-time rotational symmetry. Thus, the engaging portions need only have n-time rotational symmetry (n≧2).

The n-time rotational symmetry means symmetry of a figure, which overlaps an original figure upon rotation of (1/n)×360°, (2/n)×360°, (3/n)×360°, . . . , (n/n)×360°.

The methods shown in FIGS. 15 and 16 can be applied to anti-rotation engagement between the output gear 8 and the spring case 6 in the embodiment shown in FIG. 13.

Figure 17:
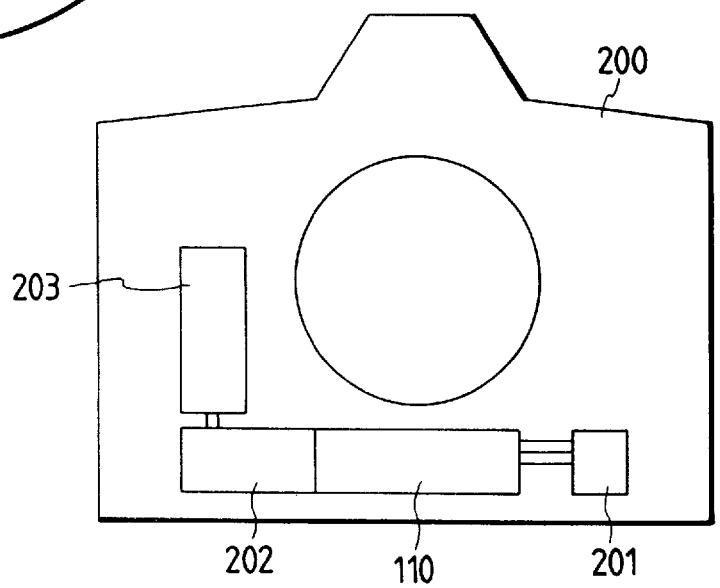
FIG. 17 is a schematic view of a film feed mechanism for a camera using a vibration driven motor.

FIG. 17 is a schematic view showing a film feed mechanism for a camera using the vibration driven motor of the present invention as a drive source. In FIG. 17, a camera main body 200 includes a controller 201 for a vibration driven motor, a transmission device 202, a film wind-up spool 203, and a vibration driven motor 110.

The vibration driven motor is controlled by the controller 201 by a known method, its output is transmitted to the film wind-up spool 203 via the transmission device 202, and a film (not shown) is wound up upon rotation of the spool 203. In this case, since the vibration driven motor of the present invention has a large output and high efficiency, a high-performance film wind-up operation can be realized. By utilizing the low rotational speed, large torque, and low noise features of the vibration driven motor, quiet characteristics remarkably superior to a conventional camera using an electromagnetic motor can be realized.

As described above, according to the embodiments shown in FIGS. 10 to 17, the following effects can be expected:

(1) Rotational force transmission means for coupling a movable member, e.g., rotor and a rotary output member or a member rotated integrally with the rotor and the rotary output member by, e.g., an engaging method so as to transmit the rotational force of the rotor to the rotary output member, are arranged at positions having n-time rotational symmetry (e.g., at two symmetrical positions, at three positions at angular intervals of 120°, . . . ), thereby canceling side pressures to the rotor caused by the reaction force of the output torque. As a result, a stable rotation free from a surface pressure nonuniformity can be obtained, and energy conversion efficiency can be improved.

Since the center of gravity of a rotary member coincides with the rotation axis, an unnecessary vibration caused by eccentricity can be prevented.

(2) When the rotational force transmission means is arranged in or near a plane of rotation of a member for axially supporting the movable member, a contact surface pressure nonuniformity between the movable member and a vibration member caused by the reaction force of the motor output can be minimized, a stable rotation can be obtained, and energy conversion efficiency of the motor can be improved.

Even when the contact surface between the movable member and the vibration member cannot be perpendicular to the rotating shaft of the rotor due to poor machining precision, since the movable member can be inclined, it is difficult for a surface pressure nonuniformity to occur.

(3) Since a means for axially supporting the movable member is substantially flush with the contact portion between the movable member and the vibration ember, the inclination and eccentric rotation of the movable member can be prevented, and a surface pressure nonuniformity caused by bending of, e.g., a shaft for supporting the movable member or the rotary output member, can be eliminated, thus improving the output and efficiency of the vibration driven motor.

(4) Since the rotational force transmission means is substantially flush with the contact portion between the movable member and the vibration member, a surface pressure non-uniformity of the output can be eliminated, and the motor output and efficiency can be improved.

What is claimed is:

1. A vibration driven motor, comprising:
  a fixed shaft;
  a vibrating member having a contact portion and means for generating a vibration therein as a driving force;
  a rotary member having a center of rotation and including an engagement portion and a contact portion, said contact portion being provided in press contact with the contact portion of said vibrating member;
  a supporting member that supports said rotary member so that said rotary member can be inclined relative to the fixed shaft, said supporting member including a contact portion which contacts a predetermined portion of said fixed shaft; and
  a rotating output member having a center of rotation the same as the center of rotation of said rotary member, and including an engagement portion that engages the engagement portion of said rotary member substantially on a plane including the contact portion of said rotary member, wherein the engagement portion of said rotating output member is substantially within a rotational plane of the contact portion of said support member, and said rotating output member is arranged for transmitting power of said rotary member to a load.

2. A vibration driven motor according to claim 1, wherein the engagement portion of said rotating output member transmits power in a rotational direction and is arranged to provide a tolerance gap between the engagement portion of said rotary member and the engagement portion of said rotating output member in a radial direction.

3. A vibration driven motor according to claim 1, wherein said engagement portion engages said rotary member and said output member at a plurality of positions along a circumferential direction, and transmits a rotation of said rotary member to said output member.

4. A vibration driven motor comprising:
  a fixed shaft;
  a vibrating member having a contact portion and means for generating a vibration therein as a driving force;
  a rotary member having a contact portion provided in press contact with the contact portion of said vibrating member, and a power output portion that transmits an output power of the motor to a load;
  a supporting member including a contact portion that contacts a predetermined portion of said fixed shaft and supports said rotary member so that said rotary member can be inclined relative to the fixed shaft, wherein said power output portion of said rotary member is located substantially on a plane including the contact portion of said rotary member and is substantially within a rotational plane of the contact portion of said supporting member.

5. A vibration driven motor having a fixed shaft, the motor comprising:
   a vibrating member having a contact portion and means for generating a vibration therein as a driving force;
   a rotary member having a contact portion provided in press contact with the contact portion of said vibrating member, and a power output portion that transmits an output power of the motor to a load; and
   a supporting member that contacts said fixed shaft and supports said rotary member so that said rotary member can be inclined relative to the fixed shaft, said supporting member including a contact portion which contacts a predetermined portion of said fixed shaft, wherein said power output portion of said rotary member is substantially within a rotational plane of the contact portion of said supporting member.

6. A system using as a power source a vibration driven motor having a fixed shaft, said system comprising:
   a vibrating member having a contact portion and means for generating a vibration therein as a driving force;
   a rotary member having a center of rotation and including an engagement portion and a contact portion, said contact portion being provided in press contact with the contact portion of said vibrating member;
   a supporting member that supports said rotary member so that said rotary member can be inclined relative to the fixed shaft, said supporting member including a contact portion which contacts a predetermined portion of said fixed shaft; and
   a rotating output member having a center of rotation the same as the center of rotation of said rotary member, and including an engagement portion that engages the engagement portion of said rotary member substantially on a plane including the contact portion of said rotary member, wherein the engagement portion of said rotating output member is substantially within a rotational plane of the contact portion of said support member, and said rotating output member is arranged to transmit power of said rotary member to a load.

7. A system according to claim 6, wherein the engagement portion of said rotating output member transmits power in a rotational direction and is arranged to provide a tolerance gap between the engagement portion of said rotary member and the engagement portion of said rotating output member in a radial direction.

8. A system according to claim 6, wherein said engagement portion engages said rotary member and said output member at a plurality of positions along a circumferential direction, and transmits a rotation of said rotary member to said output member.

9. A system using as a power source a vibration driven motor having a fixed shaft, said system comprising:
   a vibrating member having a contact portion and means for generating a vibration therein as a driving force;
   a rotary member having a contact portion provided in press contact with the contact portion of said vibrating member, and a power output portion that transmits an output power of the motor to a load; and
   a supporting member that contacts the fixed shaft and supports said rotary member so that said rotary member can be inclined relative to the fixed shaft, said supporting member including a contact portion which contacts a predetermined portion of the fixed shaft, wherein said power output portion of said rotary member is substantially on a rotational plane of the contact portion of said supporting member.

10. A vibration driven motor having a fixed shaft, comprising:
    a vibrating member having a contact portion and means for generating a vibration therein as a driving force;
    a rotary member having an engagement portion and a contact portion, said contact portion being provided in contact with the contact portion of said vibrating member;
    a supporting member that supports said rotary member so that said rotary member can be inclined relative to the fixed shaft;
    a rotating output member having an engagement portion that engages the engagement portion of said rotary member and transmits a power of said rotary member; and
    a compression member for biasing said rotary member against said vibrating member, wherein one operation portion of said compression member is contacted with said output member, and another operation portion of said compression member is contacted with said rotating member or a member which is integrally rotatable with said rotating member.

11. A vibration driven motor according to claim 10, wherein the engagement portion of said rotating output member transmits power in a rotational direction and is arranged to provide a tolerance gap between the engagement portion of said rotary member and the engagement portion of said rotating output member in a radial direction.

12. A motor according to claim 10, wherein said rotating output member is substantially rotatably supported by said fixed shaft.

13. A system using as a power source a vibration driven motor having a fixed shaft, said system comprising:
    a vibrating member having a contact portion and means for generating a vibration therein as a driving force;
    a rotary member having an engagement portion and a contact portion, said contact portion being provided in contact with the contact portion of said vibrating member;
    a supporting member that supports said rotary member so that said rotary member can be inclined relative to the fixed shaft;
    a rotating output member having an engagement portion that engages the engagement portion of said rotary member and transmits a power of said rotary member; and
    a compression member for biasing said rotary member against said vibrating member, wherein one operation portion of said compression member is contacted with said output member, and another operation portion is contacted with said rotating member or a member which is integrally rotatable with said rotating member.

14. A system according to claim 13, wherein said rotating output member is substantially rotatably supported by the fixed shaft of said motor.

15. A system according to claim 13, wherein the engagement portion of said rotating output member transmits power in a rotational direction and is arranged to provide a tolerance gap between the engagement portion of said rotary member and the engagement portion of said rotating output member in a radial direction.

16. A vibration driven motor comprising:
    a fixed shaft;
    a vibrating member having a contact portion and means for generating a vibration therein as a driving force;

a rotary member having a contact portion provided in press contact with the contact portion of said vibrating member;

a supporting member that supports said rotary member so that said rotary member can be inclined relative to the fixed shaft and includes a contact portion which contacts a predetermined portion of the fixed shaft, wherein the contact portion of said rotary member is substantially on a plane including the contact portion of said supporting member; and a rotating output member that transmits a power of said rotary member to a load.

17. A vibration driven motor comprising:

a fixed shaft;

a vibrating member having a contact portion and means for generating a vibration therein as a driving force;

a rotary member having a center of rotation and including an engagement portion and a contact portion, said contact portion being provided in press contact with the contact portion of said vibrating member;

a supporting member that supports said rotary member so that said rotary member can be inclined relative to the fixed shaft, and including a contact portion which contacts a predetermined portion of the fixed shaft; and a rotating output member having a center of rotation the same as the center of rotation of said rotary member, and including an engagement portion that engages the engagement portion of said rotary member substantially on a plane including the contact portion of said supporting member, said rotating output member being arranged for transmitting power of said rotary member to a load.

* * * * *

UNITED STATES PATENT AND TRADEMARK OFFICE
CERTIFICATE OF CORRECTION

PATENT NO. : 5,973,439

DATED : October 26, 1999

INVENTOR(S): TETSUYA NISHIO, ET AL.

It is certified that error appears in the above-identified patent and that said Letters Patent is hereby corrected as shown below:

COLUMN 1:

Line 67, "a" should read --an--.

COLUMN 2:

Line 29, "pencil type" should read --pencil-type--.

UNITED STATES PATENT AND TRADEMARK OFFICE
CERTIFICATE OF CORRECTION

PATENT NO. : 5,973,439

DATED : October 26, 1999

INVENTOR(S): TETSUYA NISHIO, ET AL.

It is certified that error appears in the above-identified patent and that said Letters Patent is hereby corrected as shown below:

COLUMN 3:

Line 36, "portion" should read --portion; and--; and
    Line 54, "has a that width portion, extends" should read --has a width portion that extends--.

COLUMN 4:

Line 54, "portion, should read --portion--.

UNITED STATES PATENT AND TRADEMARK OFFICE
CERTIFICATE OF CORRECTION

PATENT NO. : 5,973,439

DATED : October 26, 1999

INVENTOR(S): TETSUYA NISHIO, ET AL.

It is certified that error appears in the above-identified patent and that said Letters Patent is hereby corrected as shown below:

COLUMN 5:

Line 35, "vary" should read --very--; and
Line 46, "pulley," should read --pulley--.

COLUMN 12:

Line 3, "ember," should read --member,--; and
Line 13, "output" should read --output member--.

Signed and Sealed this

Eighth Day of August, 2000

Attest:

Q. TODD DICKINSON

*Attesting Officer*     *Director of Patents and Trademarks*

UNITED STATES PATENT AND TRADEMARK OFFICE
CERTIFICATE OF CORRECTION

PATENT NO. : 5,973,439

DATED : October 26, 1999

INVENTOR(S): TETSUYA NISHIO, ET AL.

It is certified that error appears in the above-identified patent and that said Letters Patent is hereby corrected as shown below:

Cover Page

Delete "[*] Notice: This patent is subject to a terminal disclaimer."

Signed and Sealed this

Nineteenth Day of December, 2000

Attest:

Q. TODD DICKINSON

*Attesting Officer*  *Commissioner of Patents and Trademarks*